US006550306B1

(12) United States Patent
Bensley

(10) Patent No.: US 6,550,306 B1
(45) Date of Patent: Apr. 22, 2003

(54) MINIATURE ACCELERATION SENSOR

(75) Inventor: Martyn Bensley, Norwich (GB)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 10/113,572

(22) Filed: Apr. 2, 2002

(65) Prior Publication Data

(65)

(51) Int. Cl.[7] .................................................. G01M 7/00

(52) U.S. Cl. ...................................................... 73/12.04

(58) Field of Search ............................. 73/12.01, 12.04, 73/12.05, 12.06, 12.07, 12.09

(56) References Cited

U.S. PATENT DOCUMENTS

| | | | | |
|---|---|---|---|---|
| 4,987,276 A | | 1/1991 | Bader et al. | 200/61.45 |
| 5,103,673 A | * | 4/1992 | Sawada et al. | 73/313 |
| 5,212,357 A | | 5/1993 | Reneau | 200/61.5 |
| 5,326,945 A | | 7/1994 | Gotoh et al. | 200/61.45 R |
| 5,440,084 A | | 8/1995 | Fuse et al. | 200/61.45 R |
| 5,770,792 A | | 6/1998 | Nakada et al. | 73/12.01 |
| 6,142,007 A | * | 11/2000 | Yuze et al. | 73/11.04 |

* cited by examiner

*Primary Examiner*—Max Noori
(74) *Attorney, Agent, or Firm*—Patrick Steinnon

(57) ABSTRACT

An upper housing is ultrasonically welded to a lower housing forming a hermetic seal about two opposed ferromagnetic leads extending from a reed switch. A shock sensing magnet has a cylindrical bore and is spring biased within the housing to slide along the glass capsule of the reed switch in response to acceleration. The magnet functions as a shock sensing mass, and is shaped to increase the reed switch dwell time. The reed switch leads are bent to extend downwardly along the sides of the housing and are bent horizontally to be parallel to the housing sides and a circuit board. A strip of mu-metal wraps three sides of the housing and has tabs extending partly beneath the housing for soldering to the circuit board. The magnet and the housing are constructed from plastics which can withstand momentary high temperature associated with a re-flow solder process.

18 Claims, 3 Drawing Sheets

MINIATURE ACCELERATION SENSOR

BACKGROUND OF THE INVENTION

The present invention relates to shock sensors in general and shock sensors employing a reed switch in particular.

Reed switches have long been used in shock sensors because of their high reliability, low cost, and relative immunity to electromagnetic interference. It is this resistance to electromagnetic interference, along with other factors, to which they owe their continued utility in the face of the widespread availability of solid-state shock sensors. Reed switch based shock sensors are widely used in combination with solid-state shock sensors. The reed switch based shock sensor provides assurance that an actual crash is taking place, while the solid-state shock sensor provides characterization of the magnitude and direction of the sensed shock. However, the advantages of reed switch based shock sensors—macro scale and hence resistance to electromagnetic interference—are also their principal liability in as much as the physical size of the shock sensor takes up considerable real estate on a circuit board. A typical reed switch based shock sensor consumes perhaps 400 square mm of real estate.

What is needed is reed switch based shock sensor which is substantially reduced in scale.

SUMMARY OF THE INVENTION

The shock sensor of this invention employs a reed switch contained within a plastic housing. A shock sensing magnet is biased to one side of the housing by a spring. The shock sensing magnet is cylindrical and has a cylindrical bore and the reed switch is positioned within the cylindrical bore. The interior cylindrical surface defined by the magnet cylindrical bore rides in sliding engagement on the reed switch glass capsule. The magnet functions as a shock sensing mass, and is shaped to increase the reed switch dwell time. The reed switch has two opposed ferromagnetic leads which extend axially concentric with the cylindrical bore and through opposite sides of a plastic housing. The leads are bent to extend downwardly along the sides of the plastic housing and then are bent horizontally so as to be parallel to the sides of the housing and to a circuit board on which the shock sensor is mounted. The housing is formed of two parts which are ultrasonically welded together. This welding hermetically seals the housing about the reed switch leads. A strip of mu-metal wraps three sides of the plastic housing and extends partly beneath the housing so that the housing may be attached to the circuit board by soldering to the circuit board tabs of mu-metal which extend beneath the housing. The magnet and the housing are constructed from plastics which can withstand the momentary high temperature associated with a re-flow solder process.

It is an feature of the present invention to provide a reed switch based shock sensor which uses less real estate on a circuit board.

It is a further feature of the present invention to provide a reed switch based shock sensor which incorporates magnetic shielding.

It is another feature of the present invention to provide a reed switch based shock sensor suitable for surface mounting to a circuit board.

It is a yet further feature of the present invention to provide a reed switch based shock sensor suitable for mounting to a circuit board with the re-flow solder process.

Further objects, features and advantages of the invention will be apparent from the following detailed description when taken in conjunction with the accompanying drawings.

DESCRIPTION OF THE PREFERRED EMBODIMENTS

Figure 1:
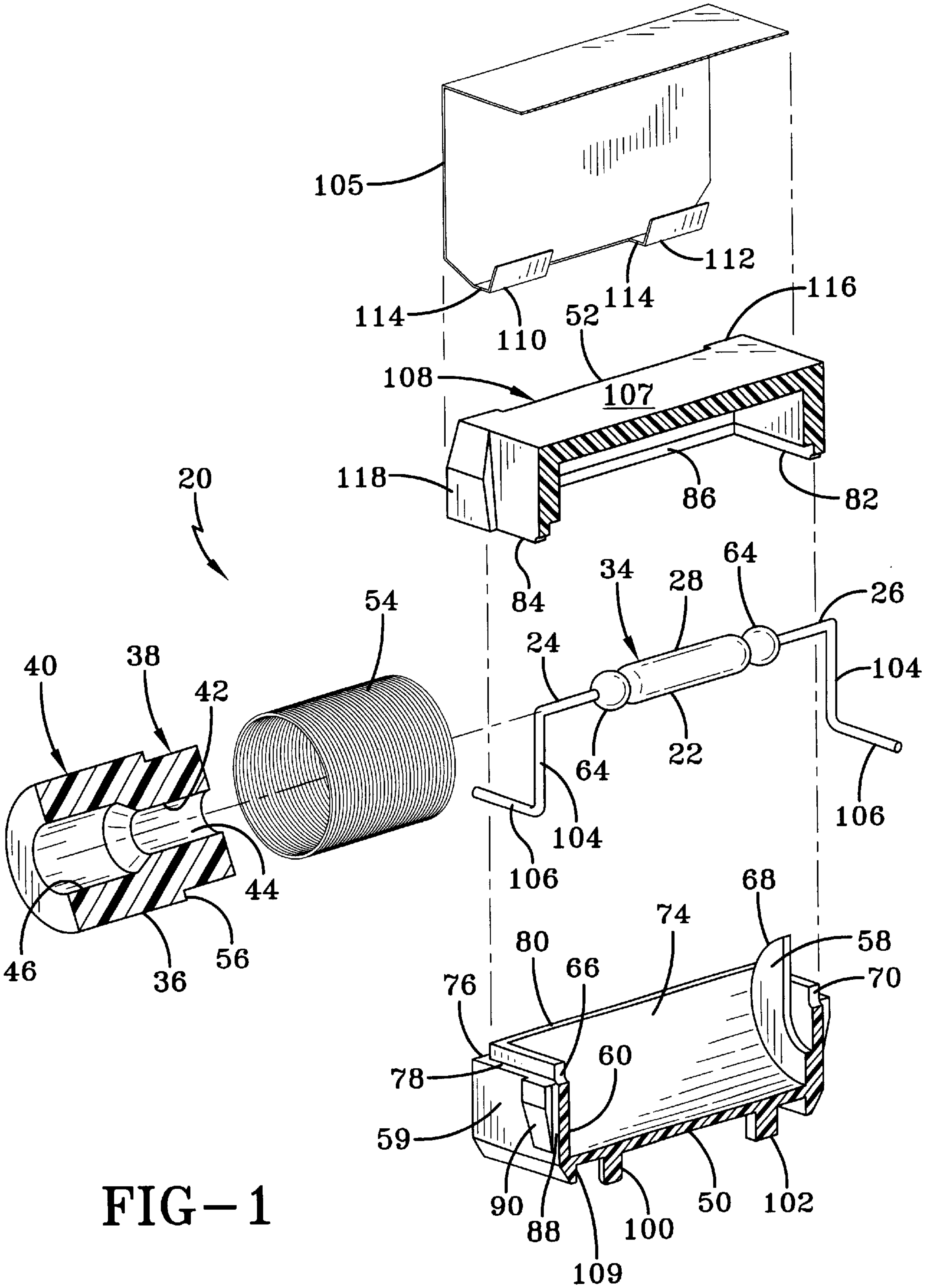
FIG. 1 is an exploded isometric cross sectional view of the shock sensor of this invention.
Figure 2:
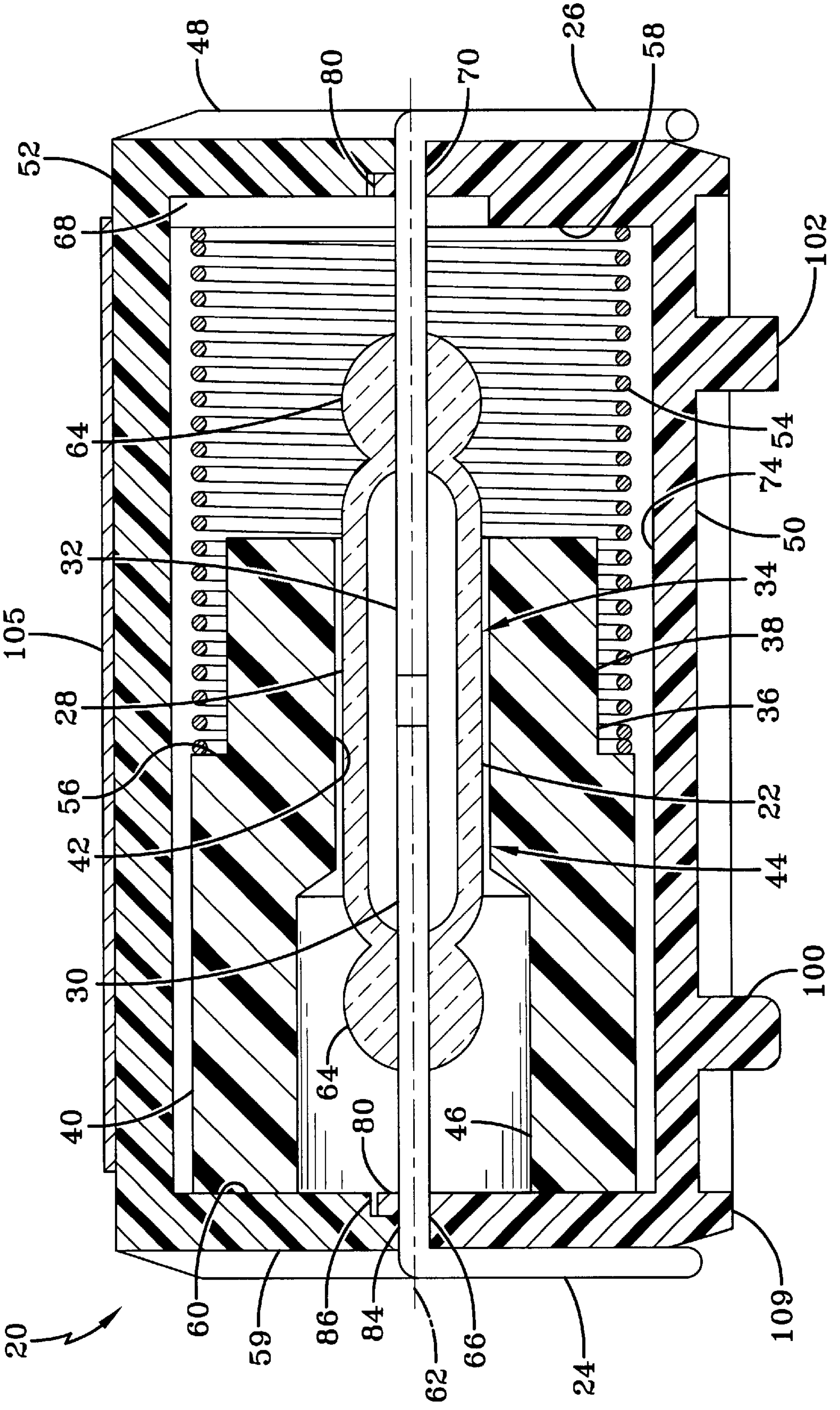
FIG. 2 is a side elevational cross sectional view of the shock sensor of FIG. 1.
Figure 3:
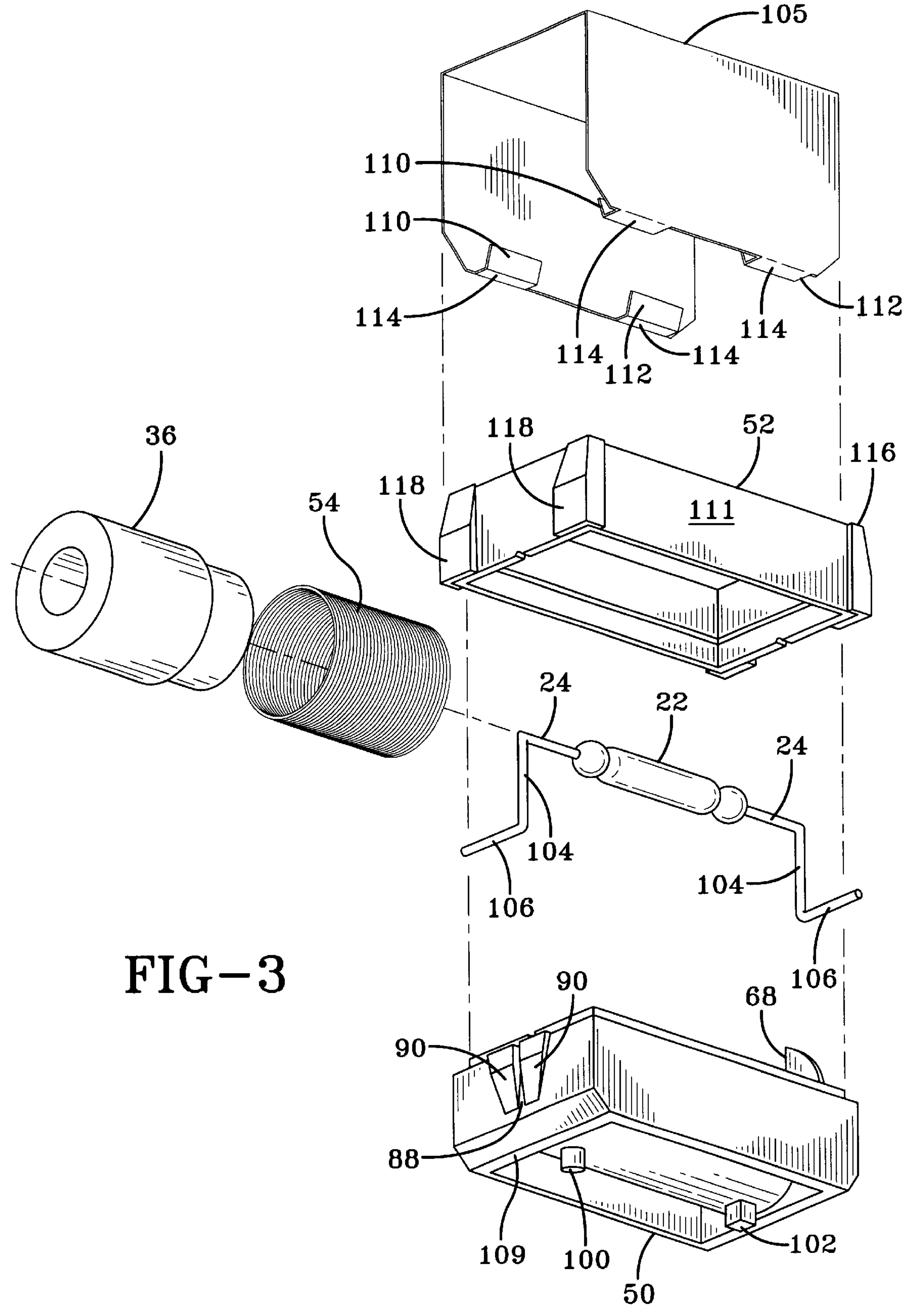
FIG. 3 is an exploded isometric view of the shock sensor of FIG. 1.

Referring more particularly to FIGS. 1–3 wherein like numbers refer to similar parts, a shock sensor 20 is shown in cross section in FIG. 2, and in exploded cross section in FIG. 1. The shock sensor 20 is constructed about a reed switch 22. The reed switch 22 has a first lead 24 and a second lead 26 which extend into a glass capsule 28. As shown in FIG. 2, the leads 24, 26 form switch reeds 30, 32 which, in the presence of a magnetic field, attract to close a circuit between the reeds 30, 32. The glass capsule 28 has an outer cylindrical surface 34 along which an activation magnet 36 slides. The activation magnet 36 has a first cylindrical surface 38 of a first diameter and a second cylindrical surface 40 of a second larger diameter. A radial flange 56 connects the first cylindrical surface 38 to the second cylindrical surface 40. The flange 56 is generally perpendicular to the axis of the reed switch. The activation magnet 36 also has an interior bore 42 which has a cylindrical surface 44 which rides on the outer cylindrical surface 34 of the glass capsule 28. An outer portion 46 of the interior bore 42 may have a diameter greater than the diameter of the surface 44. The reed switch 22 is positioned within a housing 48 which is assembled from a lower housing 50 and an upper housing 52 which are ultrasonically welded to form a hermetic seal about the reed switch 22, the magnet 36, and a biasing spring 54.

The biasing spring 54 extends between the radial flange 56 a radial surface 58 formed by the housing 48. The biasing spring 54 biases the activation magnet 36 against a second radial surface 60 formed by the opposite side 59 of housing 48. The second radial surface acts as a first stop. The activation magnet 36 moves from the second radial surface 60 towards the opposed radial surface 58 in response to an acceleration. Movement of the activation magnet 36 may continue until the spring 54 reaches its maximum compression, or the activation magnet 36 engages the opposed surface 58, whichever happens first. As the activation magnet 36 moves in response to an acceleration with a component aligned along an axis 62 defined by the glass capsule 28 of the reed switch 28, the magnet 36 causes the ferromagnetic reeds 30, 32 to attract and thereby closes the reed switch 28. The shape of the activation magnet 36, i.e. having a first cylindrical surface 38 which has a smaller diameter than a second cylindrical surface 40, produces an extended minimum dwell when the switch closes using the principles described in U.S. Pat. No. 5,212,357, issued May 18, 1993 which is incorporated herein by reference.

In order to achieve a reliable repeatable shock sensor 20, the process for assembly of the shock sensor 20 is important. First, because the outer surface 34 of the glass capsule 28 is required to perform a new function, as a guide along which the magnet 36 slides, the radial dimension of the cylindrical surface 34, and the maximum radial diameter of the glass end seals 64 are checked to assure that the activation magnet 36 will slide without binding along the reed switch 22. The surface 44 of the interior bore 42 is also specified with a relatively high smoothness so as to reduce friction between the magnet 36 and the outer cylindrical surface 34 of the glass capsule 28. The activation magnet 36 and the spring 54 are assembled onto the reed switch 22 while the leads 24, 26 are in their as-manufactured condition: extending linearly along the axis 62 of the reed switch 22 defined by the cylindrical surface 34 of the glass capsule 28. The lower housing 50 has a first notch 66 at the first side 59 of the housing, and a second notch 70 at the second side 72 of the housing. A spring positioning structure 68 extends upwardly on either side of the second notch 70. The lower housing 50 is positioned into an assembly jig (not shown) and the reed switch 22, activation magnet 36, and spring 54 are placed within the lower housing 50 such that the first lead 24 is held within the first notch 66, and the second lead 26 passes through the spring positioning structure 68 and through the second notch 70.

As shown in FIG. 1, the radial surface 58 against which the spring 54 is held is formed in part by the lower housing 50 and the spring positioning structure 68 which allows the spring to be held in place while the upper housing 52 is joined to the lower housing 50. The lower housing 50 has an upwardly opening cylindrical cavity 74 which has a peripheral edge 76 formed of an outer flat edge surface 78 and an inner upstanding lip 80. The upper housing 52 has a complementary peripheral edge 82 with an outer flat edge surface 84 which mates with the outer flat edge surface 78 of the lower housing 50. The upper housing 52 also has a groove 86 which receives the inner upstanding lip 80 of the lower housing 50. The upper housing 52 has a small wedge shaped edge (not shown for clarity) along the flat outer edge surface 84 which forms the ultrasonic sealing material, and facilitates focusing of the ultrasonic energy, in accordance with standard practices for forming an ultrasonic joint. The lower housing 50 is held in a nonmoving fixture (not shown) which also positions the reed switch by a stop which positions the distal end of the first lead 24. The upper housing 52 is held in an ultrasonic welding apparatus and brought into engagement with the lower housing 50 to form the ultrasonic weld which joins the upper housing 52 to the lower housing 50.

The first lead 24 and the second lead 26 are then bent downwardly about 90 degrees from the ax is 62 so that portions 104 run along the sides of the housing and are held within grooves 88 formed by positioning structures 90 on the lower housing 50. The leads 24, 26 are then bent about 90 degrees to run parallel to the sides of the housing 48 as shown in FIG. 1, so that horizontal portions 106 may form surface mount structures which may also extend across two mounting pads (not shown) on a circuit board (not shown). By having the lead portions 106 extend across two mounting pads a continuity check is provided. The shock sensor itself, when not undergoing acceleration, is an open circuit and so the presence of the shock sensor on a circuit board cannot be detected by electrical means unless the shock sensor also provides a short circuit such as provided by the lead portions 106 when they extending between two mounting pads on the circuit board.

The shock sensor 20 is designed to be surface mounted by the re-flow solder process. The mounted shock sensor 20 is approximately seventeen millimeters long by ten millimeters wide thus occupying relatively less circuit board real estate. The shock sensor 20 is temporarily mounted to the circuit board by a round peg 100 and a square peg 102. A mu-metal shield 105 wraps the top side 107, the rear side 108, and the front side 111 of the housing as illustrated in FIG. 3. The mu-metal shield 105 has four tabs 110, 112, which are shown in FIG. 3, which extend under the bottom edge 109 of the lower housing 50. Portions 114 of the four tabs, 110, 112 are soldered in the re-flow process to solder pads on a circuit board and thus assist in holding the shock sensor 20 to a circuit board. Mu-metal is a nickel-iron alloy (77 percent Ni, 15 percent Fe, plus Cu and Mo) which is particularly effective at shielding magnetic fields. The mu-metal shield 105 is manufactured with etched-in lines to facilitate each bend in the mu-metal shield. While not completely enclosing the shock sensor 20, the mu-metal shield substantially reduces the penetration of magnetic fields into or out of the shock sensor 20. The mu-metal shield 105 is prevented from sliding on the housing by projections 116 on the rear 108 and front sides (not shown) of the upper housing 52.

In the re-flow solder process a circuit board is passed through a convection and/or infrared oven where the temperature of the board and components,is rapidly raised to approximately 250° C. and held at that temperature for approximately ten to fifteen seconds. A solder paste which has been has been applied to the mounting pads on the circuit board melts at the high temperature, forming solder joints between the components and the board. Parts which are mounted by the re-flow solder process must be able to withstand high temperatures for a short period of time. The reed switch 22 is inherently a high temperature component, but the plastics used to manufacture the shock sensor 20 must be selected for their high-temperature capabilities. The housing 48 is manufactured of a high temperature thermoplastic such as glass filled Polyphthalamide (PPA). The magnet 36 can be constructed of particles of NIB (Neodymium_Iron_Boron) bonded together by Polyphenylene Sulfide (PPS) which produces a high strength magnet which can withstand the temperature used in the re-flow soldering process. The biasing spring 54 may be manufactured of conventional stainless-steel spring material which is inherently capable of withstanding the temperatures used in the re flow soldering process.

To avoid damage to circuit board contacting portions 106 of the leads 24, 26, the shock sensor 20 may advantageously be tested in the upside-down position, and the upper housing 52 has positioning structures 118 to facilitate mounting the shock sensor in the upside-down position in a test fixture.

It should be understood that the leads 24, 26 are hermetically sealed by the ultrasonic welding process between the upper housing 52 and the lower housing 50. Thus the entire shock sensor, including the activation magnet 36, the reed switch 22, and the biasing spring 54 are sealed from the atmosphere. It should be understood that where the leads extend through the housing other conventional means of sealing, such as a gasket or an adhesive could be used.

It should be understood that the activation threshold can be varied, for example between two and ten times earth normal acceleration, by varying the spring constant of the biasing spring 54 either by increasing the number of coils or by increasing the thickness of the wire used to construct the spring coil.

It should be understood that the mu-metal shield will typically be about 0.15 mm thick, but other thicknesses could be used. In addition, various proprietary magnetic shielding alloys could also be used. In addition, while losing the benefit of magnetic shielding, mu-metal could be replaced with a lower cost alloy to provide the circuit board retaining features of the mu-metal shield. The mu-metal shield may also be etched with or printed with an arrow indicating the direction of applied force when the shock sensor is actuated.

It should be understood that a dwell time of approximately 1.5 milliseconds will be sufficient for many applications, and the extended dwell feature is not essential to the functionality of the shock sensor 20. The shock sensor 20 while having particular utility in the automotive industry, to detect the onset of a vehicle crash, it may also be used to detect heavy braking in a vehicle, and the sensor maybe used to detect vibration in appliances, and rough handling of packages during shipping.

It is understood that the invention is not limited to the particular construction and arrangement of parts herein illustrated and described, but embraces all such modified forms thereof as come within the scope of the following claims.

I claim:

1. A shock sensor comprising:

a housing;

a reed switch mounted to the housing having a first lead, and a second lead extending into a cylindrical glass capsule, the cylindrical glass capsule defining an axis and an outer cylindrical surface, the glass capsule having a first end sealed about the first lead, and a second end sealed about the second lead, the first lead forming a first reed, and the second lead forming a second reed, the first and second reed being hermetically sealed within the glass capsule, to form a magnetically activated switch;

a shock sensing magnetic mass having an interior bore through which the reed switch extends, the magnet in sliding engagement with the outer cylindrical surface of the glass capsule, the magnet movable by sliding along the outer cylindrical surface of the glass capsule from a first position to a second position at which the magnetically activated switch changes state;

a biasing member mounted to the housing between the shock sensing magnetic mass and a portion of the housing to bias the shock sensing magnetic mass in the first position, the biasing member allowing the shock sensing magnetic mass to move to the second position when the shock sensing magnetic mass experiences an acceleration having a component parallel to the defined axis which is sufficient to overcome the biasing member.

2. The shock sensor of claim 1 wherein the first lead and the second lead have a first bend so that a first portion of each lead extends axially away from the defined axis, and the first lead and the second lead have a second bend so that a second portion of the first lead and the second lead lie in a common plane, the second portion of the first lead and the second lead functioning as surface mount electrical contacts.

3. The shock sensor of claim 1 further comprising a mu-metal shield positioned on the exterior of the housing to reduce the penetration of magnetic fields through the housing.

4. The shock sensor of claim 1 wherein the housing has a back side, a top side, and a front side, and further comprising a metal foil wrapping the back side, the top side, and the front side, the metal foil providing tabs which extend beneath the housing for fixing the housing to a circuit board.

5. The shock sensor of claim 4 wherein the metal foil is comprised of mu-metal.

6. The shock sensor of claim 1 wherein the housing comprises an upper housing and a lower housing, and the reed switch, shock sensing magnet, and biasing member are positioned between the upper housing and the lower housing, the upper housing being joined to the lower housing by a hermetic seal.

7. The shock sensor of claim 6 wherein the lower housing has a spring positioning structure, so that the reed switch, shock sensing magnet, and biasing member are prepositionable on the lower housing.

8. The shock sensor of claim 1 wherein the biasing member is a coil spring, and wherein the shock sensing magnetic mass has a portion of a first diameter and a portion of a second smaller diameter and wherein the coil spring engages an interface formed between the first diameter portion and the second diameter portion and extends over the second diameter portion.

9. A shock sensor comprising:

a housing having a back side, a top side, and a front side;

a reed switch mounted to the housing having a first lead and a second lead which extend into a cylindrical glass capsule, the cylindrical glass capsule defining an axis and having an outer cylindrical surface, the glass capsule having a first end sealed about the first lead, and a second end sealed about the second lead, the first lead forming a first reed and the second lead forming a second reed which are hermetically sealed within the glass capsule, to form a magnetically activated switch;

a shock sensing magnetic mass having an interior bore through which the reed switch extends, the magnet movable from a first position to a second position at which the magnetically activated switch changes state;

a biasing member mounted in the housing between the shock sensing magnetic mass and a portion of the housing, to bias the shock sensing magnetic mass in the first position, the biasing member allowing the shock sensing magnetic mass to move to the second position when the shock sensing magnetic mass experiences an acceleration having a component parallel to the defined axis which is sufficient to overcome the biasing member;

wherein the first lead and the second lead have a first bend of about 90 degrees so that a first portion of each lead extends axially away from the defined axis, and the first lead and the second lead have a second bend of about 90 degrees so that a second portion of the first lead and the second lead lie in a common plane, the second portion of the first lead and the second lead functioning as surface mount electrical contacts; and a metal foil wrapping the housing back side, the top side, and the front side, the metal foil providing tabs which extend beneath the housing for fixing the housing to a circuit board.

10. The shock sensor of claim 9 wherein the magnet is in sliding engagement with the outer cylindrical surface of the glass capsule, the magnet movable by sliding along the outer cylindrical surface of the glass capsule from the first position to the second position at which the magnetically activated switch changes state.

11. The shock sensor of claim 9 wherein the metal foil is comprised of mu-metal.

12. The shock sensor of claim 9 wherein the housing comprises an upper housing and a lower housing, and the reed switch, shock sensing magnet and biasing member are positioned between the upper housing and the lower housing, the upper housing being joined to the lower housing by a hermetic seal.

13. The shock sensor of claim 12 wherein the lower housing has a spring positioning structure, so that the reed switch, shock sensing magnet and biasing member are prepositionable on the lower housing.

14. The shock sensor of claim 9 wherein the biasing member is a coil spring, and wherein the shock sensing magnetic mass has a portion of a first diameter and a portion of a second smaller diameter and wherein the coil spring engages an interface formed between the first diameter portion and the second diameter portion and extends over the second diameter portion.

15. The shock sensor of claim 9 wherein the magnet is in sliding engagement with the outer cylindrical surface of the glass capsule.

16. A shock sensor comprising:

a housing;

a reed switch mounted to the housing having a first lead, and a second lead extending into a cylindrical glass capsule, the cylindrical glass capsule defining an axis and having an outer cylindrical surface, the glass capsule having a first end sealed about the first lead, and a second end sealed about the second lead, the first lead forming a first reed, the second lead forming a second reed, the first reed and the second reed being hermetically sealed within the glass capsule, to form a magnetically activated switch;

a shock sensing magnetic mass having an interior bore through which the reed switch extends, the magnet movable from a first position to a second position at which the magnetically activated switch changes state;

a biasing member mounted in the housing, between the shock sensing magnetic mass and a portion of the housing to bias the shock sensing magnetic mass in the first position, the biasing member allowing the shock sensing magnetic mass to move to the second position when the shock sensing magnetic mass experiences an acceleration having a component parallel to the defined axis which is sufficient to overcome the biasing member; and a mu-metal shield positioned on the exterior of the housing to reduce the penetration of magnetic fields through the housing.

17. The shock sensor of claim 16 wherein the first lead and the second lead have a first bend so that a first portion of each lead extends axially away from the defined axis, and the first lead and the second lead have a second bend so that a second portion of the first lead and the second lead lie in a common plane, the second portion of the first lead and the second lead functioning as surface mount electrical contacts.

18. The shock sensor of claim 16 wherein the housing has a back side, a top side, and a front side, wherein the mu-metal shield wraps the back side, the top side, and the front side and has tabs which extend beneath the housing for fixing the housing to a circuit board.

* * * * *